(12) United States Patent
Yue et al.

(10) Patent No.: US 12,039,733 B2
(45) Date of Patent: Jul. 16, 2024

(54) METHOD FOR IDENTIFYING INDIVIDUALS OF OPLEGNATHUS PUNCTATUS BASED ON CONVOLUTIONAL NEURAL NETWORK

(71) Applicant: LUDONG UNIVERSITY, Yantai (CN)

(72) Inventors: Jun Yue, Yantai (CN); Beibei Li, Yantai (CN); Shixiang Jia, Yantai (CN); Zhenbo Li, Yantai (CN); Qing Wang, Yantai (CN); Zheng Ma, Yantai (CN); Guangjie Kou, Yantai (CN); Tao Yao, Yantai (CN); Zhenzhong Li, Yantai (CN)

(73) Assignee: Ludong University, Yantai (CN)

( * ) Notice: Subject to any disclaimer, the term of this patent is extended or adjusted under 35 U.S.C. 154(b) by 475 days.

(21) Appl. No.: 17/341,852

(22) Filed: Jun. 8, 2021

(65) Prior Publication Data

US 2021/0383149 A1 Dec. 9, 2021

(30) Foreign Application Priority Data

Jun. 8, 2020 (CN) .......................... 202010517103.0

(51) Int. Cl.
*G06T 7/11* (2017.01)
*G06N 3/04* (2023.01)
(Continued)

(52) U.S. Cl.
CPC .................. *G06T 7/11* (2017.01); *G06N 3/04* (2013.01); *G06N 3/086* (2013.01); *G06T 7/10* (2017.01);
(Continued)

(58) Field of Classification Search
CPC ... G06T 7/11; G06T 7/10; G06T 2207/20081; G06T 2207/20084; G06N 3/04;
(Continued)

(56) References Cited

U.S. PATENT DOCUMENTS 11,164,291 B2 * 11/2021 Snellgrove ................ G06T 5/77
2021/0142479 A1 * 5/2021 Phogat .................. G06T 11/206

FOREIGN PATENT DOCUMENTS

| CN | 110727871   | * | 1/2020 |              |
|----|-------------|---|--------|--------------|
| CN | 110766013   | * | 2/2020 |              |
| CN | 110827415 A | * | 2/2020 | ... G06N 3/0454 |

OTHER PUBLICATIONS

Robust tracking of fish schools using CNN for head identification (Year: 2016).*

(Continued)

*Primary Examiner* — Emily C Terrell
*Assistant Examiner* — Stefano Anthony Dardano
(74) *Attorney, Agent, or Firm* — Cook Alex LTD

(57) ABSTRACT

A method for identifying an individual of an oplegnathus punctatus based on a convolutional neural network is provided. Target initial positioning involves three continuous convolutional layers and an average pooling layer. A region of feature interest point is obtained, a hyperparameter candidate box is set to obtain a region, thereby obtaining an approximate position of a target object. II_Net backbone convolutional neural network includes six convolutional layers and four pooling layers, which includes a LeakyReLU activation function used as an activation function of the first convolutional layer, convolutional network layers of Alexnet and parameter data, and a maximum pooling layer of an overlapped pooling structure. Fully connected layers use a genetic algorithm to improve data transmission between layers. With the established model, identification of the individual of the oplegnathus punctatus is performed by using test data.

4 Claims, 3 Drawing Sheets

(51) Int. Cl.
    *G06N 3/086* (2023.01)
    *G06T 7/10* (2017.01)
    *G06V 10/25* (2022.01)
    *G06V 10/82* (2022.01)
    *G06V 40/10* (2022.01)

(52) U.S. Cl.
    CPC .............. *G06V 10/25* (2022.01); *G06V 10/82* (2022.01); *G06V 40/10* (2022.01)

(58) Field of Classification Search
    CPC ........ G06N 3/086; G06N 3/045; G06N 3/126; G06N 3/08; G06V 10/25; G06V 10/82; G06V 40/10; G06V 20/40; G06F 18/241
    See application file for complete search history.

(56) References Cited

OTHER PUBLICATIONS

Fast Accurate Fish Detection and Recognition of Underwater Images with Fast R-CNN (Year: 2015).*

\* cited by examiner

| II_Net Configuration |
|---|
| input (224×224×3 image) |
| conv3 – 64      LeakyReLU |
| Maxpool |
| conv3 – 128      ReLU |
| Maxpool |
| conv3 – 192      ReLU |
| Maxpool |
| conv3 – 384      ReLU |
| conv3 – 256      ReLU |
| conv3 – 256      ReLU |
| Maxpool |
| GA_Linear - 9 |
| Softmax |

FIG. 2

METHOD FOR IDENTIFYING INDIVIDUALS OF OPLEGNATHUS PUNCTATUS BASED ON CONVOLUTIONAL NEURAL NETWORK

CROSS-REFERENCE TO RELATED APPLICATION(S)

This application claims priority benefits of Chinese Patent Application No. 202010517103.0 filed with the China National Intellectual Property Administration on Jun. 8, 2020.

The '103.0 application is incorporated herein by reference in its entirety.

FIELD OF THE INVENTION

The disclosure relates to the field of image identification technology, and in particular, to a method for identifying individual of an oplegnathus punctatus based on a convolutional neural network.

In recent years, the oplegnathus punctatus has become an emerging fish species in the mariculture industry in China, which has a tremendous prospect for developments because of its higher ornamental value, economic value and edible value. Currently, research on the oplegnathus punctatus focuses mainly on early breeding, disease immunization, and the like. However, little attention has been paid to identification of an individual of the oplegnathus punctatus.

Identification of individuals of the oplegnathus punctatus often relies on external labels or labeling the outside of the fish, counting the number of populations in a certain environment, or tracing the swimming trajectory of the fish group. Some labeling methods that cause severe damages to the fish bodies at the early stage, such as a cutting fin labeling method, a hanging scutcheon labeling method, a branding labeling method, and the like. Some methods that cause less damage to fish bodies are also being adopted, such as external labeling methods including a fluorescence labeling method, an isotope labeling method, PIT, VIE, and the like. Although external labeling methods are widely used, they can be constrained by the distance range, label loss, movement disorder, fish body death, etc.

With the advancement of computer vision technology and the development of visual biometrics, as well as the reduction of the cost of video data acquisition, the identification technology for individuals of animals gradually turns to the image feature extraction. Meanwhile, with in-depth studies of face identification concepts and widespread applications of convolutional neural networks, deep learning algorithms can also be applied in the field of individual identification of animal images.

Currently there are few research results for identifying individual fish. There are many individual identification studies on large-sized fishes, which are mainly used for tracking fish groups, such as individual identification of a rhincodon typus, individual identification of a balaenoptera, individual identification of an atelomycterus marmoratus, etc. However, there are also individual identification studies on small-sized fishes, for example, a cichlidae is recognized by a color combination of face and body. The identification methods can depend on different body types of the fish. In some embodiments, the feature extraction of an overall contour is preferable for identification of large-sized fish (such as a rhincodon typus), and identification of many small-sized fish is achieved by color contrast.

The individual identification of the oplegnathus punctatus differs from other fish, because the overall feature extraction is of little significance due to non-obvious color contrast and the small body size of the oplegnathus punctatus itself. The feature extraction of image details of the oplegnathus punctatus is more useful due to intricate spots of the oplegnathus punctatus. Utilizing the above characteristics, the present disclosure involves using a convolutional neural network model to identify individuals of the oplegnathus punctatus.

SUMMARY OF THE INVENTION

In view of the above-mentioned problems, the present disclosure proposes a method for identifying individuals of an oplegnathus punctatus based on a convolutional neural network. The method can include the following steps.

Step 1: acquiring and pre-processing a training set data and a test set data of the individuals of the oplegnathus punctatus;

training the training set data by using the convolutional neural network to obtain an oplegnathus punctatus individual identification model, including:

an image target initial positioning and segmentation module including three continuous convolutional layers and an average pooling layer with one kernel and a step size of 1; a region of feature interest point in a training set image being obtained upon the training set image being processed by the three continuous convolutional layers; a hyperparameter candidate box being set by the average pooling layer based on a size of the individual of the oplegnathus punctatus to obtain a region where a plurality of feature interest points are concentrated, thereby obtaining an approximate position of a target object in the image; and the original image being segmented into image regions according to both information on the approximate position of the target object in the image given by a target initial positioning and information on the hyperparameter candidate box; and II_Net backbone convolutional neural network including six convolutional layers and four pooling layers, a LeakyReLU activation function acting as an activation function of the first convolutional layer; the last three layers of an Alexnet convolutional network structure and parameter data being used; a maximum pooling layer being of an overlapped pooling structure, and when a maximum pooling is performed for the second time, a dilated convolution being utilized; a fully connected layer being improved based on a genetic algorithm; and Step 3: identifying the individual of the oplegnathus punctatus according to the test set data using the oplegnathus punctatus individual identification model.

In some embodiments, video data of the oplegnathus punctatus can be screened to obtain the training set data, a framing processing can be performed on the obtained video data, and a similarity analysis can be performed on the training set data by using an MS-SSIM (Multi-Scale Structural Similarity) algorithm.

In some embodiments, the test set data and the training set data can include information derived from different sources.

In some embodiments, a fitness function of the genetic algorithm can be represented as a linear variation formula below, for transferring parameters between fully connected layers:

$F(x)=w^T*x+b$, wherein w is a weight, b is a bias, x is an input matrix, T is a transpose operation, and $F(x)$ is an output, * is a multiplication operation.

In some embodiments, no overall edge detection and optimization processing is required to be performed on the image by the image target initial positioning and segmentation module.

In some embodiments, the fully connected layer improved based on the genetic algorithm can optimize and improve parameters of the network.

In some embodiments, beneficial effects of the present disclosure can include, but are not limited to, the individual identification of the oplegnathus punctatus becomes the basis of many research contents.

In some embodiments, a method according to the present disclosure can be used to establish a database for each oplegnathus punctatus, which is conductive to obtaining statistics of data of the oplegnathus punctatus, tracking the growth status of animals, such as size and weight, etc., monitoring the behaviors of the individuals of oplegnathus punctatus, preliminarily detecting certain diseases of the oplegnathus punctatus, and tracing sources of food to ensure the safety of food sources in the true sense.

BRIEF DESCRIPTION OF THE DRAWINGS

FIG. 2 is a structural diagram of the convolutional neural network for identifying individuals of the oplegnathus punctatus.

DETAILED DESCRIPTION OF ILLUSTRATIVE EMBODIMENT(S)

The embodiments are described in detail below with reference to the drawings.

Figure 1:
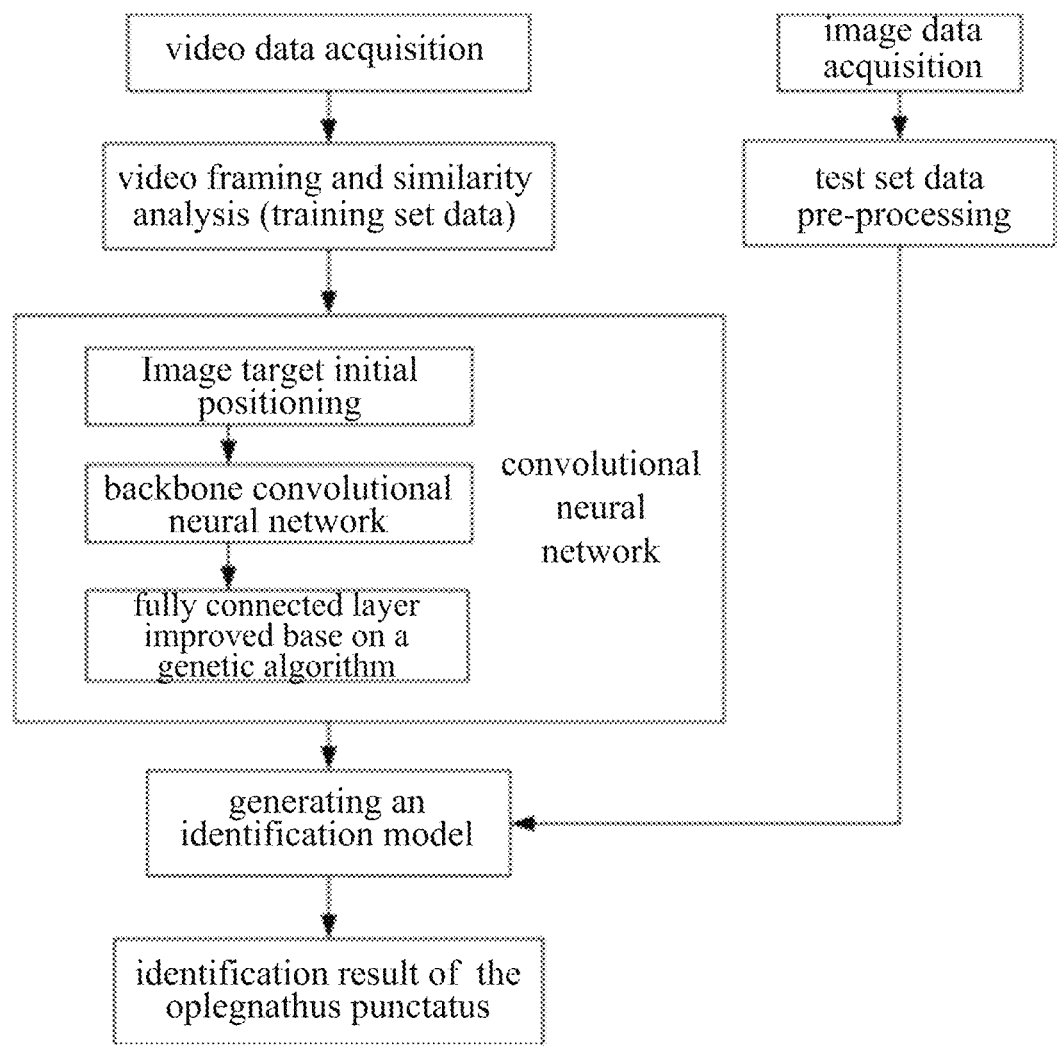
FIG. 1 is a flowchart of a method for identifying individuals of the oplegnathus punctatus based on a convolutional neural network.

FIG. 1 is a flowchart of a method for identifying individuals of the oplegnathus punctatus based on a convolutional neural network, which includes the following steps 1-3.

Step 1: acquisition and relevant pre-processing of data information is performed. The data information can include training set data and test set data.

The fish species to be identified in some embodiments, is oplegnathus punctatus belonging to oplegnathidae. In some embodiments, the oplegnathus punctatus are about 175 g in weight and are selected from Laizhou Mingbo Co. Ltd. In a specific example, data information of nine oplegnathus punctatus is collected in total. A living region of the oplegnathus punctatus was a breeding pond with 150 cm×150 cm×60 cm in the experimental environment. A Hikvision camera was arranged at 1.5 in above the middle of the breeding pond, and two underwater cameras with a spacing of 75 cm were arranged in the breeding pond horizontally. In order to distinguish the numbers of nine oplegnathus punctatus, the nine oplegnathus punctatus were temporarily placed in nets with different numbers during photographing, for judging the identification results of the oplegnathus punctatus. The net of each oplegnathus punctatus was numbered, such as, from 1 to 9.

1) Training set data. About 36 minutes of video of each oplegnathus punctatus is selected as a training set of initial video data. Then a framing processing is performed on the obtained video data (25 frames per second, resolution of 1920*1080). In some embodiments, a similarity analysis can be performed on the original data set by using an MS-SSIM (Multi-Scale-Structural Similarity) algorithm (i.e., formula (1)) to obtain 40981 images.

$$MSSIM(X, Y) = \frac{1}{M} \sum_{j=1}^{M} \frac{(2\mu_{x_j}\mu_{y_j} + C_1)(2\sigma_{x_jy_j} + C_2)}{(\mu_{x_j}^2 + \mu_{y_j}^2 + C_1)(\sigma_{x_j}^2 + \sigma_{y_j}^2 + C_2)}. \quad \text{(Formula 1)}$$

wherein, X and Y are images, M is a maximum scale, j is an integer in the interval [1, M], MISSIM (X,Y) is multi-scale-structural similarity, $x_j$ is an image of the X transformed by scale j, $y_j$ is an image of the Y transformed by scale j, $\mu_{x_j}$ is a mean value of $x_j$, $\mu_{y_j}$ is a mean value of $y_j$, $\sigma_{x_j}^2$ is a variance of $x_j$, $\sigma_{y_j}^2$, is a variance of $y_j$, $\sigma_{x_jy_j}$ is a covariance of $x_j$ and $y_j$, and $C_1=(k_1L)^2$, $C_2=(k_2L)^2$ which are stable variables, wherein L is a dynamic range of pixel values (L=255 for 8 bits/pixel gray scale images), and $k_1 \ll 1$ and $k_2 \ll 1$ are two scalar constants (in the embodiment $k_1=0.01$ and $k_2=0.03$).

2) Test set data. Following the principle of increasing the difficulty of identification, information acquisition can be done in such a way that the test set and the training set are derived from different sources. In some embodiments, each oplegnathus punctatus can be manually photographed as a test set, so as to obtain 120 images of each oplegnathus punctatus, and thus 1080 images in the test set in total.

Step 2: the convolutional neural network for identifying individuals of oplegnathus punctatus is constructed and trained with the training set data.

FIG. 2 is a structural diagram of a convolutional neural network for identifying individuals of the oplegnathus punctatus.

Target Initial Positioning and Segmentation.

The original images (i.e., the images pre-processed by the MS-SSIM algorithm) in the training set are segmented, which mainly implements the target initial positioning of the original images and segmentation of the original images based on the position of the target. The image pre-processing based on the feature extraction of the convolutional neural network is aids in subsequently and accurately extracting the target feature in the images.

The video image data obtained from a real breeding environment can have clutters, and in addition to the desired target data, some redundant data other than the target data of the oplegnathus punctatus, such as airstones, etc., can be captured in the images. In some embodiments, the input of non-target data into the neural network model not only increases the computation load of the model, but also takes some background features with significant features as the features of target itself. In some embodiments, this may cause an identification error of the oplegnathus punctatus, a decrease in the accuracy of the test set data, and the like.

The target initial positioning proposed in the present disclosure means preliminary target positioning according to features obtained after an image is input into a convolutional neural network. First, a region of feature interest point in the image can be obtained upon the image is processed by the three-layer convolutional neural network. Then, a candidate box with a hyperparameter of 178*178 is set based on the sizes of the oplegnathus punctatus in this experiment to obtain a region where a plurality of feature interest points are relatively concentrated, thereby obtaining an approximate position of a target object in the image.

In some embodiments, the target initial positioning can involve three continuous convolutional layers, and an average pooling layer with one kernel of 178 and a step size of 1. In some embodiments, the three convolutional layers perform a process of extracting features of an input image, and the average pooling layer performs a process of obtaining a plurality of candidate boxes.

In some embodiments, unlike the conventional object detection requiring manually labeling and training, the setting and deletion of the positioning candidate box are simpler and more convenient. Firstly, because a plurality of candidate boxes of the same size need to be acquired, which is similar to consistency of the sampling boxes for the pooling layer, and meanwhile data of all image pixel points need to be considered on average, the size of the convolution kernel can be modified based on the average pooling layer in acquiring the candidate boxes, whereby a plurality of target candidate boxes containing the data about the whole image can be obtained. In some embodiments, the average pooling method can be selected to perform target initial positioning on 224*224 images to obtain 79*79 candidate boxes with the same size at different positions for segmenting the image at the next step. Meanwhile, according to the idea of the maximum pooling layer, a candidate box, in which the sample data is the largest, can be selected from 79*79 candidate boxes as the final target region of interest, that is the final target candidate box, and the position of this candidate box in the image can be output.

The target segmentation can be based on the position information derived from the target initial positioning and the hyperparameter information of the candidate box size given at the beginning, and wherein, the original image can be segmented into image regions to obtain the processed image that is finally input into the neural network model. Overall edge detection and optimization processing on the image can be dispensed with during the image segmentation. In some embodiments, image segmentation can be implemented to narrow down the image to be extracted to a greater extent, and to reduce the computation and processing of non-target data as much as possible. Furthermore, in contrast to the instance segmentation of the convolutional neural network, the image segmentation may not be restricted to meticulous segmentation of the shape of the oplegnathus punctatus itself, and no annotation and training may be required. As a result, an image, which contains the target object and is easy to perform computation processing, can be obtained according to only the position information derived from target initial positioning and the size of the candidate box.

In some embodiments, testing can be performed with the object of reducing the computation load and reducing the acquisition of non-target data where the regions are not concentrated as much as possible, whereby the feature extracted from the processed image can be closer to the self-feature information of the target in the image. In some embodiments, the target extraction of the method may be not too strict to ensure to obtain pure target data, because, at least in some embodiments, only the candidate box segmentation for the image is performed. However, the method can be practical and effective for the overall data extraction and subsequent experimental results.

II_Net Backbone Convolutional Neural Network

The convolutional neural network model in the embodiment of the present disclosure can include 3393216 parameters in total.

The backbone network of the convolutional neural of the present disclosure can have the following features:
i) II_Net backbone convolutional neural network can include six convolutional layers and four pooling layers;
ii) a LeakyReLU activation function can be used as an activation function of the first convolutional layer;
iii) the maximum pooling layers used in the convolutional neural network structure can be provided with an overlapped pooling structure to minimize, or at least reduce, the loss of image target features; meanwhile, when a maximum pooling is performed for the second time, a dilated convolution can be utilized to increase the receptive field, so as to improve the accuracy of identifying small-sized objects by the model and further facilitate the acquisition of target features;
vi) in some embodiments, the last three layers of an Alexnet convolutional network structure and parameter data can be used, to reduce computation time;
v) one fully connected layer based on a genetic algorithm can be used in lieu of the fully connected layers to greatly reduce the number of parameters and the complexity of data computation. A comparison between the II_Net backbone convolutional neural network model and other existing network models is given in Table 1. It can be seen from the table that the accuracy rate of the II_Net backbone convolutional neural network is the highest, and the false positive rate and false negative rate are the lowest.

TABLE 1

Comparison of Various Network Models

| network structure model | accuracy rate (%) | false positive rate (%) | false negative rate (%) |
|---|---|---|---|
| VGG (pretrained = True) | 53.06 | 8.00 | 54.11 |
| AlexNet (pretrained = True) | 43.24 | 9.01 | 60.37 |
| ResNet50 (pretrained = True) | 37.50 | 9.17 | 63.98 |
| Inception V3 (pretrained = True) | 45.83 | 8.54 | 48.51 |
| VGG (pretrained = False) | 29.35 | 9.79 | 73.62 |
| AlexNet (pretrained = False) | 43.24 | 8.74 | 55.38 |
| ResNet50 (pretrained = False) | 30.09 | 9.71 | 63.02 |
| Inception V3 (pretrained = False) | 31.0 | 9.64 | 72.35 |
| II_Net backbone | 70.56 | 6.76 | 36.60 |
| II_Net | 99.63 | 4.78 | 0.41 |

A Fully Connected Layer Improved Based on a Genetic Algorithm.

The genetic algorithm is a method of searching for optimal solutions by simulating natural evolution processes. In the present disclosure, the genetic algorithm can be selected to combine with a fully connected network structure to optimize the data. In some embodiments, the hyperparameters are used as follows: the population is 30, the crossover probability is 80%, the mutation probability is 3%, and the number of iterations is 10.

In some embodiments, in order for the fully connected layer improved based on the genetic algorithm to be better adapted to the convolutional neural structure, a linear variation formula (formula (2)) for transferring parameters between the fully connected layers is used as a fitness function of the genetic algorithm. In this way, the weight transmission of the fully connected layers can be excellently inherited, and the computational time consumption due to the more complex fitness function can be avoided.

$$F(x) = w^T * x + b \quad \text{Formula 2}$$

wherein w is a weight, b is a bias, x is an input matrix, T is a transpose operation, and F(x) is an output, * is a multiplication operation.

Being different from a single forward propagation of the conventional fully connected layer, the fully connected layer improved based on the genetic algorithm in the present disclosure has the characteristic of back propagation. The transmission node and the weight information carried in the transmission node can be optimized by crossover, mutation, and iteration of the genetic algorithm. Then the fitness function can be utilized to evaluate whether the node is suitable for connecting to a certain node of the next layer. In the situations where the population range and the number of iterations are allowed, it is possible to find, within a global range, a certain node in the next layer suitable for the node of this layer as much as possible, which can improve the accuracy of individual identification for the oplegnathus punctatus, satisfy the performance of dropout of the conventional fully connected layer, and reduce use of full connection parameters. However, a larger number of iterations and populations represent naturally the consumption of time complexity. In some embodiments, it is therefore necessary to perform tests and experiments on the hyperparameters of the fully connected layer, and/or the like, by means of different datasets, to enable a better, faster and more accurate application of the fully connected layer to image processing tasks, such as image identification and the like.

Figure 3:
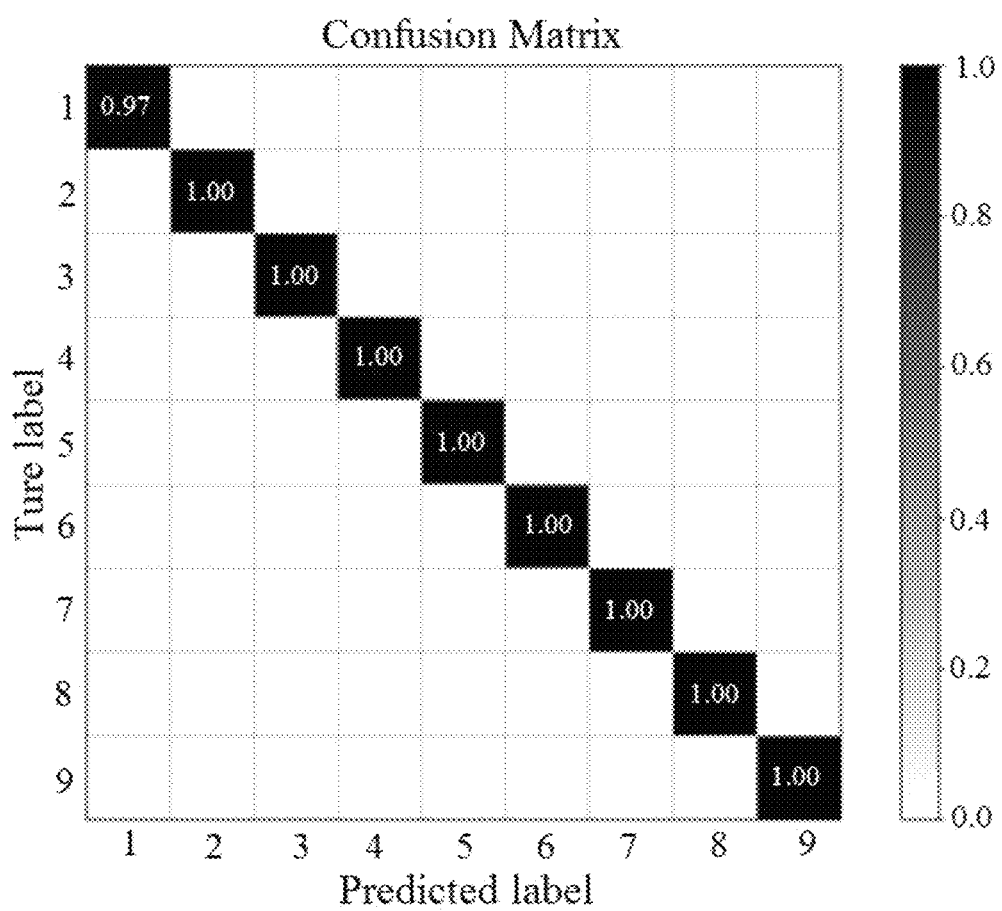
FIG. 3 is a confusion matrix diagram of identifying individuals of 9 oplegnathus punctatus according to an embodiment of the present disclosure.

Step 3: identification of the individual of the oplegnathus punctatus. In some embodiments, the individual of the oplegnathus punctatus is identified according to the test set data using the oplegnathus punctatus individual identification model obtained in Step 2. For illustrative purposes, FIG. 3 shows a confusion matrix diagram of identifying individuals of nine oplegnathus punctatus according to the embodiments of the present disclosure. It can be seen from the FIG. 3 that identification of each of the oplegnathus punctatus is substantially precise and error free.

The embodiment is merely a preferred embodiment of the present disclosure, but the scope of protection of the present disclosure is not limited thereto, and any variation or replacement readily conceivable by a person skilled in the art within the technical scope disclosed in the present disclosure shall fall within the scope of protection of the present disclosure. Therefore, the scope of protection of the present disclosure should be defined by the scope of protection of the claims.

What is claimed is:

1. A method for identifying an individual of a group of oplegnathus punctatus based on a convolutional neural network, comprising:

acquiring and pre-processing a training set data and a test set data of the individual of said group of oplegnathus punctatus;

training said training set data by using the convolutional neural network to obtain an oplegnathus punctatus individual identification model, comprising:

an image target initial positioning and segmentation module comprising three continuous convolutional layers and an average pooling layer with one kernel and a step size of 1;

a region of feature interest point in a training set image being obtained upon the training set image being processed by the three continuous convolutional layers;

a hyperparameter candidate box being set by the average pooling layer based on a size of the individual of said group of oplegnathus punctatus to obtain a region where a plurality of feature interest points are concentrated, thereby obtaining an approximate position of a target object in the image;

and an image being segmented into image regions according to both information on the approximate position of the target object in the image given by a target initial positioning and information on the hyperparameter candidate box; and II_Net backbone convolutional neural network comprising six convolutional layers and four pooling layers, a LeakyReLU activation function acting as an activation function of a first convolutional layer; a last three layers of an Alexnet convolutional network structure and parameter data being used; a maximum pooling layer being of an overlapped pooling structure, and when a maximum pooling is performed for a second time, a dilated convolution being utilized; a fully connected layer being improved based on a genetic algorithm; and identifying the individual of said group of oplegnathus punctatus according to said test set data using the oplegnathus punctatus individual identification model.

2. The method of claim 1, wherein video data of the oplegnathus punctatus are screened to obtain a video data set, a framing processing is performed on the video data set to obtain original data, and a similarity analysis is performed on the original data by using an Multi-Scale Structural Similarity (MS-SSIM) algorithm to obtain the training set data.

3. The method of claim 2, wherein the test set data and the training set data comprise information derived from different sources.

4. The method of claim 1, wherein a fitness function of the genetic algorithm is represented by a linear variation formula, $F(x)=w^T*x+b$, for transferring parameters among the fully connected layers, wherein w is a weight, b is a bias, x is an input matrix, T is a transpose operation, and $F(x)$ is a output, * is a multiplication operation.

* * * * *